3,172,474
PROCESS FOR REMOVAL OF SALT-CONTAMINATED WELL FLUIDS FROM A WELL BORE
Frederick H. Siegele, Westport, Conn., assignor to American Cyanamid Company, New York, N.Y., a corporation of Maine
No Drawing. Filed Oct. 9, 1961, Ser. No. 143,582
8 Claims. (Cl. 166—45)

This invention relates to a novel treatment for the removal of fluids in oil or gas wells. More particularly, it relates to the use of sulfonated N-higher alkyl propionamides as foaming agents effective in removing fluids from such wells. Still more particularly, the invention is concerned with the rapid removal of water contaminated with hydrocarbons, brine, clays, calcium salt derived from calciferous formations and other contaminating salts, such as magnesium salts found in dolomitic formations.

As is known, accumulated well fluids seriously hinder profitable exploitation of oil or gas wells, particularly in the producing stages. Accumulated fluids are also known to hinder either air or oil emulsion mud drilling in the preparation of wells. If such fluids can be effectively removed, the rate of oil or gas production would increase. Advantageously, the time for preparing wells for production would be shortened. Hence, removal of fluids from wells has been a vital and serious problem in the oil and gas industries. One of the noteworthy methods proposed for the removal of accumulated fluids resides in the use of anionic detergents introduced into the well by any appropriate means. Exemplary anionic materials are the higher alkyl sulfates, the alkyl aryl sulfonates and the higher alkyl sulfosuccinates. Unfortunately, none of the anionic additives heretofore employed, is found to be entirely satisfactory. This is because they lose their effectiveness in well fluids containing high concentrations of dissolved calcium and magnesium salts. If an anionic material, which is both economical and effective in a hard water environment could be provided to remove accumulated well fluids, it would fulfill a long-felt need in the industry.

It is, therefore, a principal object of the invention to provide efficient servicing of a well bore by the removal of fluids therefrom. It is another object to provide a class of foaming agents active in all environments, particularly in the presence of calcium and magnesium ions. Other objects and advantages will be ascertained from a consideration of the following detailed description.

To this end, it has been unexpectedly found that certain sulfonated anionic detergents are highly effective as foaming agents in aqueous salt environments and as surfactants added to flood waters used in secondary oil recovery operations. The foaming or surfactant reagents, sufonated N-higher alkyl propionamides, surprisingly maintain their high level of foaming activity even in an environment containing high concentrations of salt contaminants. Removal of brine accumulations from relatively deep wells, as well as removal of scale, clay, mud and solid particles from the well bore is readily accomplished, thereby increasing the productivity of a producing well.

In accordance with the process of the present invention, small amounts of a sulfonated N-alkyl propionamide, usually within the range of about 0.1% to 5%, based on the water content in the well, are added. The foaming agent may be introduced into the well in the form of its alkali metal salt either dissolved in water, or it may be admixed with a suitable inert polar organic solvent, such as methyl alcohol, ethyl alcohol, isopropanol, dimethyl formamide and the like.

The sulfonated N-alkyl propionamides employed in the present invention may be conveniently prepared by reacting a suitable α-unsaturated olefin containing of from 10 to 20 carbon atoms or mixtures thereof and an unsaturated nitrile in the presence of sulfuric acid. Resultant N-alkyl acrylamide is then reacted with an alkali metal bisulfite with the formation of alkali metal salt of sulfonated N-alkyl propionamide. A pH of at least 7.5 is maintained throughout the sulfonation reaction by incorporating therein a basic compound, such as ammonium hydroxide, sodium hydroxide, potassium carbonate and lithium hydroxide.

Illustrative unsaturated olefins employed as a reactant include: laurylene, decene-1, undecene-1, dodecene-1, tridecene-1, tetradecene-1, pentadecene-1, hexadecene-1, octadecene-1, telomers of isopropylene and isobutylene, such as propylene tetramer, propylene hexamer, triisobutylene, tetraisobutylene, and mixtures of such α-unsaturated olefins and their equivalents. Contemplated nitriles include: acrylonitrile, α-substituted acrylonitrile, such as methacrylonitrile and β-substituted acrylonitriles, such as crotononitrile, β-chloroacrylonitrile and equivalents thereof.

The incorporation of sulfonated N-alkyl proprionamide foaming agent into a well is accomplished by conventional procedures. Thus, for example, a small amount is forced into a well bore and there held under a positive pressure above the formation pressure for from at least thirty minutes to not more than about twenty-four hours. Usually, some 30 to 300 p.s.i. above the formation pressure is a good operating range. Thereafter, the pressure is released and the fluid accumulated in the well is eliminated as a foam. For optimum operation, however, from about 0.1% to about 5% of the foaming agent is added, based on the weight of the accumulated well fluid. The amount of such accumulated fluid in a well is determined by conventional liquid level measurement.

The following illustrative examples will serve to more fully describe the instant invention. They are not to be taken as limitative but are presented as exemplary of the best mode of operation. Unless otherwise stated, the parts are by weight.

EXAMPLE 1

This example illustrates the preparation of one of the foaming agents employed herein.

450 parts (2.5 mols) of an α-unsaturated olefin fraction having from $C_{11}$–$C_{15}$ and an average carbon chain length of 13 and an average molecular weight of 180, and 132.5 parts (2.5 mols) of acrylonitrile are reacted in the presence of 245 parts (2.5 mols) of concentrated sulfuric acid. After the acid has been added, the temperature of the reaction mixture is maintained at about 50° C. until a reaction product containing principally an N-alkyl ($C_{11}$–$C_{15}$) acrylamide and minor amounts (about 5%) of alkane ($C_{11}$–$C_{15}$) sulfate is formed. This reaction product is next added with stirring to 400 parts of water in a suitable reaction vessel equipped with pH electrodes connected to a pH meter and recorder. Aqueous potassium hydroxide is added slowly thereto until a pH of 9–12 is obtained. Thereafter, about 52 parts of sodium metabisulfite and 250 parts of isopropyl alcohol are added to the resultant acrylamide reaction product. The reaction vessel is heated to reflux (84° C.) while maintaining the pH at the value indicated and until a one cubic centimeter sample gives a clear solution in 100 parts of water. This test determines whether the sulfonation end point has been reached. The isopropyl alcohol is then stripped off and resultant sodium salt of sulfonated N-($C_{11}$–$C_{15}$ alkyl) propionamide is obtained in good yield.

EXAMPLE 2

This example illustrates the preparation of another sulfonated N-higher alkyl propionamide containing from 15 to 20 carbon atoms.

To a mixture comprising (a) 241 parts of a linear α-unsaturated olefin fraction containing a mixture of fifteen to twenty carbon atoms and having an average molecular weight of 241 and (b) 58.4 parts (1.1 mols) of acrylonitrile are slowly added 98.0 parts of sulfuric acid while stirring. The temperature of the stirred mixture is maintained at from between 40° C. and 60° C. This addition requires about thirty minutes. The mixture is then stirred for an additional hour. Thereafter, 800 parts of water and 100 parts of isopropyl alcohol are added thereto. Resultant mixture is adjusted to a pH of 8 by incorporating sufficient sodium hydroxide. 95 parts of sodium metabisulfite are next added and the pH again adjusted to 8. The mixture is refluxed (84° C.) for 2.5 hours and the isopropyl alcohol removed by distillation. The resulting solution is pale yellow in color. On cooling, the sodium sulfonated N-($C_{15}$–$C_{20}$ alkyl) propionamide product separates from solution as a white solid in good yield.

EXAMPLE 3

Essentially the same procedure as is employed in Example 2 above, is employed here except that 216 parts of octadecene-1, 58.4 parts of acrylonitrile, 98.0 parts of concentrated sulfuric acid and 104.6 parts of sodium metabisulfite are employed. The appearance of the product is the same as in Example 2, analyzing chiefly as the N-alkyl derivative containing eighteen carbon atoms.

Propylene tetramer is substituted for the octadecene-1 in the above example. A white solid, sulfonated N-dodecyl propionamide, is recovered in good yield.

To demonstrate the effect of the foaming agents of the present invention, the following examples are presented.

EXAMPLE 4

The foaming capacity of several typical detergents is compared with the foaming agents prepared in accordance with the teachings of Examples 1 to 3, inclusive. The foaming agents employed in a series of runs are as follows:

(I) Sodium alkyl benzene sulfonate,
(II) Sodium lauryl sulfate,
(III) Sodium dioctyl sulfosuccinate,
(IV) Ammonium salt of sulfate ester of alkyl phenoxypolyoxyethylene ethanol,
(V) Sodium salt of sulfonated N-alkyl (11–15 carbon atoms) propionamide (prepared by Example 1 above),
(VI) Sodium salt of sulfonated N-alkyl (15–20 carbon atoms) propionamide (prepared by Example 2 above), and
(VII) Sodium salt of sulfonated N-octadecyl propionamide (prepared by Example 3 above).

The dynamic test designed to demonstrate foaming agent effectiveness utilizes a vertical glass column fitted with a medium frit Pyrex disc at the base of the column. Air is forced through the disc at a constant and reproducible flow rate of 40 cubic centimeters per minute. This forms a foam with the test solution containing the foaming agent. The foam flows out of the top of the column into a graduated cylinder where the foam is broken with a standard anti-foam agent and the volume of liquid collected is measured. The dimensions of the glass column are such that 500 cc. of liquid occupy a height of 55 centimeters.

The results of these tests are recorded in the table below:

Table I

| Detergent | Foaming Capacity, cc. Liquid/15 min. at ½ lb./bbl. Additive | | | |
| --- | --- | --- | --- | --- |
| | Deionized Water | 10% Aqueous Sodium Chloride | Sea Water | Deionized Water Containing 1% $Ca^{++}$ |
| I | 174 | 109.0 | 89.5 | 17.5 |
| II | 181.5 | 94.0 | 125.0 | 1.3 |
| III | 180 | 0 | 40 | 0 |
| IV | 157 | 20 | 65 | 0.8 |
| V | 170.5 | 133.0 | 152.0 | 122.5 |
| VI | 161 | 131.0 | 147.0 | 118 |
| VII | 162 | 132 | 149 | 119 |

It will be seen from the above that the foaming capacity sharply decreases in an aqueous medium containing as little as 1% $Ca^{++}$ when utilizing an alkyl aryl sulfonate and other known anionics. Unexpectedly, this undesirable result is avoided when employing the anionic alkali metal salts of sulfonate N-alkyl propionamides of the present invention.

EXAMPLE 5

A gas well is completed to a total depth of 3,358 feet with 7 inch casing set at a depth of 3,241 feet and a 6 inch liner from 3,218 to 3,358 feet. The gas-producing zone extends from 3,241 to 3,358 feet. A liquid level measurement shows the water level at a depth of 3,043 feet or at water column of 315 feet. Upon analysis of the water it contains at least about 1.5% calcium ion. A back pressure test shows a Q100 value (productivity at a difference in squared pressures of 100,000) of 45 million cubic feet per day (m.c.f.d.). Subsequently, 10 gallons of a 50% solution of sodium lauryl sulfate, a foaming agent, is forced into the well preceded and followed by five gallons of water, all under a pressure of 50 p.s.i. above the formation pressure.

The well is shut down for twelve hours, then opened, but the water level is found to remain substantially unchanged at the 3,050 foot level.

EXAMPLE 6

Repeating Example 5 in every detail, except that the corresponding amount of sodium dodecylbenzene sulfonate is employed in lieu of sodium lauryl sulfate, no appreciable change in water level of Example 5 is noted.

EXAMPLE 7

Substituting the anionic prepared in Example 1 above for the foaming agent in Example 5, it is noted that the water level decreased, since about nine barrels of water are removed from the 7 inch casing at a depth of about 3,200 feet with a reservoir pressure of about 300 p.s.i.

With the removal of water, the Q100 value as defined in Example 5 above, is increased to about 75 million cubic feet per day (m.c.f.d.).

EXAMPLE 8

An oil well is drilled through a limestone formation to a depth of about 5,720 feet. Due to the accumulation of sludge in oil emulsions at the producing formation site, a steady decline in production from ten barrels per day to about two barrels per day is noted. To rectify this adverse condition, ten gallons of a 50% aqueous solution of the anionic compound as prepared in Example 2 above are introduced under a pressure from about 50 p.s.i. to about 75 p.s.i. above the formation pressure and held for four hours. Upon release of the pressure, approximately five barrels of an oil in water emulsion containing suspended clays are removed.

It is found that the foregoing treatment results in increased oil production to a level of about eight barrels per day. Recovery of oil at this level is noted for approximately three months.

I claim:

1. In the removal of salt contaminated fluids from a fluid hydrocarbon-producing well, the improvement which comprises the steps of: introducing under a positive pressure above formation pressure an alkali metal salt of a sulfonated N-higher alkyl propionamide into said well at a concentration of from about 0.1% to about 5.0% of the said propionamide based on the water present in the well, and thereafter reducing the said pressure and recovering salt contaminated fluid as a substantially stable foam.

2. The process according to claim 1, wherein the well is a gas well.

3. The process according to claim, wherein the well is an oil well.

4. The process according to claim 1, wherein the sulfonated N-higher alkyl propionamide is the sodium salt of sulfonated N-alkyl propionamide, said alkyl containing from 11 to 15 carbon atoms.

5. The process according to claim 1, wherein the sulfonated N-higher alkyl propionamide is the sodium salt of sulfonated N-alkyl propionamide, said alkyl containing from 15 to 20 carbon atoms.

6. The process according to claim 1, wherein the sulfonated N-higher alkyl propionamide is the sodium salt of sulfonated N-alkyl propionamide, said alkyl containing 18 carbon atoms.

7. The process according to claim 1, wherein the sulfonated N-higher alkyl propionamide is the sodium salt of sulfonated N-alkyl propionamide, said alkyl containing 12 carbon atoms.

8. In the removal of calcium and magnesium salt contaminated fluids from a fluid hydrocarbon producing well, the improvement which comprises the steps of: introducing under a positive pressure of at least about 30 p.s.i. above the formation pressure an alkali metal salt of a sulfonated N-higher alkyl propionamide into said well at the rate of from about 0.1% to about 5.0% of the said propionamide based on the water present in the well, and thereafter reducing the said pressure and recovering a substantially stable foam containing the salt contaminated water.

References Cited by the Examiner

UNITED STATES PATENTS

| | | | |
|---|---|---|---|
| 1,931,540 | 10/33 | Hentrich | 252—355 |
| 3,073,387 | 1/63 | Dunning et al. | 166—45 |

OTHER REFERENCES

Sluhan: "Wetting Agents, Their Structure, Characteristics, and Uses," Paper Trade Journal, August 20, 1940, page 1 to 6, inclusive.

Murray: Oil and Gas Journal, "Water Still Poses Tough Problem in Drilling With Air," vol. 55, June 1957, pages 105 to 112.

Dunning et al.: "Using Foaming Agents To Remove Liquids From Gas Wells," Monograph 11, Bureau of Mines, published by American Gas Association, N.Y., N.Y., 1961, Catalog No. 36/PR. Pages 1, 2, 12, 13, and 24 to 26 relied upon.

Van Antwerpen: Industrial and Engineering Chemistry, "Surface Active Agents," vol. 31, No. 1, pages 66 to 69.

BENJAMIN HERSH, *Primary Examiner.*

NORMAN YUDKOFF, *Examiner.*